(12) United States Patent
Harry et al.

(10) Patent No.: US 7,178,104 B1
(45) Date of Patent: Feb. 13, 2007

(54) SYSTEM AND METHOD FOR GENERATING STRUCTURED DOCUMENTS IN A NON-LINEAR MANNER

(75) Inventors: Craig Harry, Redmond, WA (US); Patrick Moulhaud, Seattle, WA (US); Jacob DongJu Kim, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 367 days.

(21) Appl. No.: 10/136,802

(22) Filed: May 1, 2002

Related U.S. Application Data (60) Provisional application No. 60/357,742, filed on Feb. 15, 2002.

(51) Int. Cl.
*G06F 15/00* (2006.01)
(52) U.S. Cl. .............. 715/520; 715/500; 715/501.1
(58) Field of Classification Search ............... 715/500, 715/520, 501.1
See application file for complete search history.

(56) References Cited

U.S. PATENT DOCUMENTS

| | | | |
|---|---|---|---|
| 2001/0034739 A1* | 10/2001 | Anecki et al. | 707/500 |
| 2002/0069230 A1* | 6/2002 | Schubert et al. | 707/530 |
| 2002/0178190 A1* | 11/2002 | Pope et al. | 707/530 |
| 2003/0144903 A1* | 7/2003 | Brechner et al. | 705/14 |
| 2003/0188262 A1* | 10/2003 | Maxwell et al. | 715/507 |
| 2003/0221162 A1* | 11/2003 | Sridhar | 715/501.1 |
| 2004/0117383 A1* | 6/2004 | Lee et al. | 707/100 |
| 2004/0138787 A1* | 7/2004 | Ransom et al. | 700/295 |
| 2004/0230536 A1* | 11/2004 | Fung et al. | 705/64 |

OTHER PUBLICATIONS

Bavestrelli, G., "Building HTML Documents with C++," *C/C++ Users Journal*, vol. 18, No. 4, Apr. 2000, pp. 67-70.
Caumanns, J., "Bottom-up Generation of Hypermedia Documents," *Multimedia Tools and Applications*, vol. 12, No. 2-3, Nov. 2000, pp. 109-128.
"Delivering Documents on the World Wide Web," *A.P. Publications*, vol. 27, No. 4, Jul. 1996, pp. 8-12.
Merrall, S. and A. Billig, "Dynamo: Dynamic Document Generation in Java," PAJava 99. *Proceedings of the First International Conference on the Practical Application of Java*, London, UK, Apr. 21-23, 1999, pp. 73-89.

* cited by examiner

*Primary Examiner*—Stephen Hong
*Assistant Examiner*—Kristina Honeycutt
(74) *Attorney, Agent, or Firm*—Christensen O'Connor Johnson Kindness PLLC (57) ABSTRACT

A system and method for generating structured electronic documents in a non-linear manner are provided. A document generation server obtains a request to generate an electronic document having logically ordered sections. Proceeding according to the logical order of the electronic document, the document generation server populates at least a portion of any section having data dependent on a subsequently ordered section with a content bookmark. Thereafter, the document generation server replaces the content bookmark with the dependent data after the data for the subsequently ordered section has been obtained.

42 Claims, 11 Drawing Sheets

SYSTEM AND METHOD FOR GENERATING STRUCTURED DOCUMENTS IN A NON-LINEAR MANNER

CROSS-REFERENCE TO RELATED APPLICATION

This application claims the benefit of U.S. Provisional Application No. 60/357,742, entitled SYSTEMS AND METHOD FOR GENERATING STRUCTURED DOCUMENTS IN A NON-LINEAR MANNER, and filed on Feb. 15, 2002. U.S. Provisional Application No. 60/357,742 is incorporated by reference herein.

FIELD OF THE INVENTION

In general, the present application relates to computer software and communication networks, and in particular to a system and method for generating structured documents having a logical order in a non-linear manner.

BACKGROUND OF THE INVENTION

Generally described, communication networks facilitate the transmission of data between a number of computing devices. In one typical application, computing devices can utilize global communication networks, such as the Internet, to request and transmit a variety of data. In one embodiment, computing devices can utilize a global communication network, such as the World Wide Web, to request and transmit electronic data that can be displayed on the computing device as a combination of graphical and textual data, often referred to as a Web page. In another embodiment, computing devices can utilize a communication network to direct graphics and text to a specific user identified by a logical address within the global network. This is often referred to as electronic mail, or e-mail.

In both the above-examples, to transmit data over the global communication networks, the various computing devices utilize standard communication languages and encoding protocols. With reference to the World Wide Web, computing devices can communicate by utilizing software applications, referred to as browser software applications, that obtain standard encoded electronic data and generate corresponding graphical and textual images on the computing device display. More specifically, the electronic data can be encoded and transmitted in a markup language, such as the Hypertext Markup Language ("HTML") or the extensible markup language ("XML"), that instructs the browser software application how to generate, or otherwise obtain, the specified graphics and/or text to be displayed. Thus, the particular order in which the HTML or XML data is encoded can effect the manner in which a corresponding computer display is rendered by the browser software application.

Figure 1:
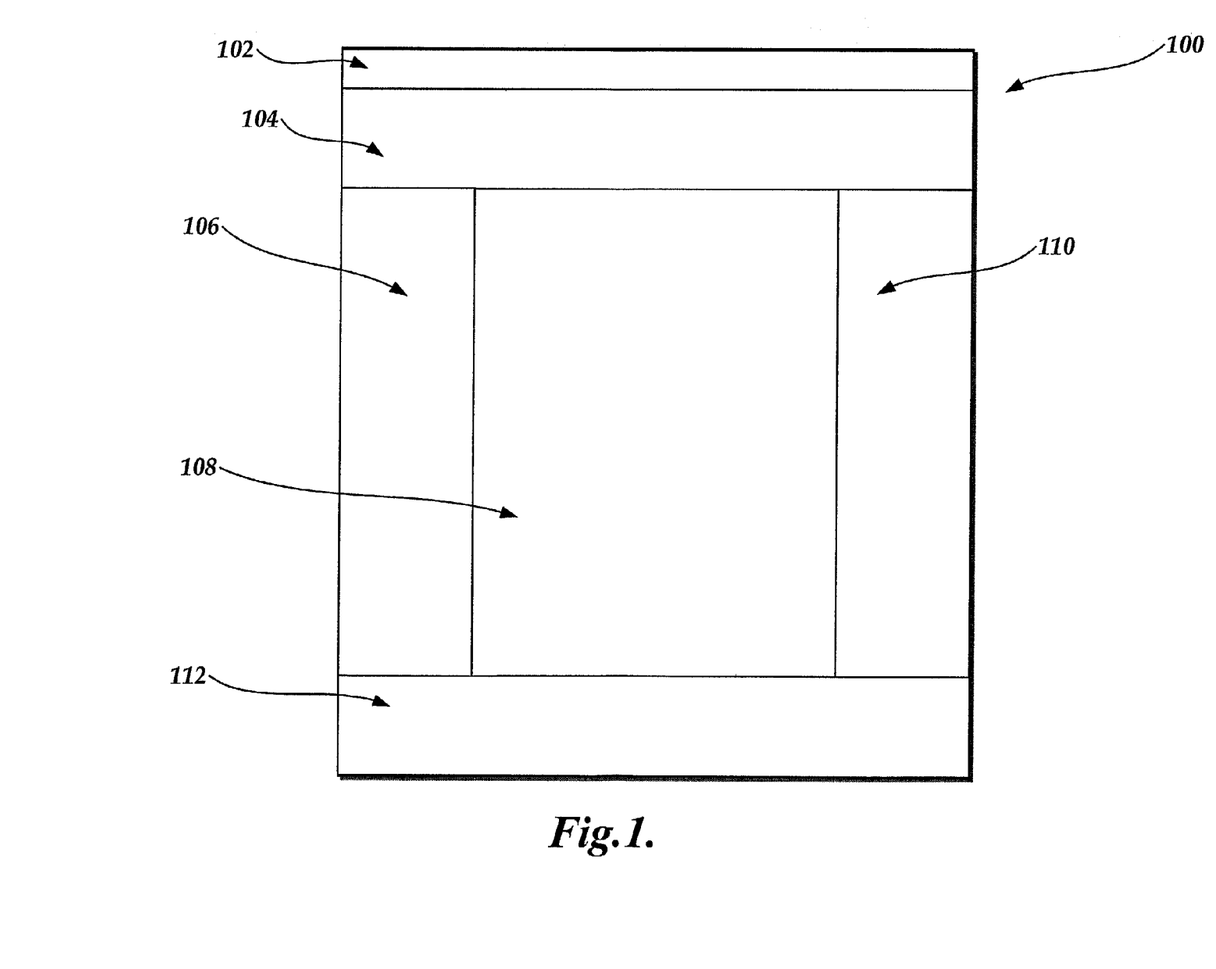
FIG. 1 is a block diagram illustrative of a computer screen display generated from a structured HTML file in accordance with the present invention.

FIG. 1 is a block diagram of a screen display 100 generated by a computing device from HTML data in accordance with the present invention. As illustrated in FIG. 1, the screen display includes a top banner section 102, another banner section 104, three middle sections 106, 108, 110, and a bottom banner section 112. Accordingly, the HTML data would include HTML code that would define the various properties and content of each section. Additionally, in accordance with standard encoding practice, the HTML code for section 102 would appear first, followed by the HTML code for section 104, followed by the HTML code for sections 106, 108, and 110, and lastly, the HTML code for section 112. The location of individual pieces of HTML code dictates the location in which it is rendered to a display screen by the browser software application. Accordingly, if the layout of FIG. 1 is a template for a display, any HTML following the template would have to follow the corresponding order of encoding.

In practice, a computing device requests the HTML data from another computing device via the communication network. If the content of the HTML data is static, the computing device receiving the request can obtain the static HTML data from memory and transmit the data to the requesting computing device. However, if the HTML data is not static, the computing device may have to dynamically generate the HTML data according to a predefined template upon receiving the request. For example, the computing device may have to refer to a database, such as through a data server, to obtain user-specific data to populate one or more sections of the display. Accordingly, each data request can increase the delay in completing the computing device request and utilizes system communication and processing resources.

One skilled in the relevant art will appreciate that content from one section may depend on one or more parameters from content corresponding to another, often later appearing section. For example, assume that the computing device request corresponds to a Web page having a section, such as section 104, for displaying a number of textual messages a particular user has received and another section, such as section 108, that includes the actual content of the messages. In accordance with a conventional linear order document generation method, a computing device would access the database a first time to calculate the number of messages for the user and include that information as part of the content associated with the first section 104. Additionally, the computing device would access the same data in the database a second time to obtain the content of the messages as part of the content associated with the second section 108. Thus, because the content of section 104 must be specified prior to the content of section 108, redundant database inquiries are required. Accordingly, linear generation of structured HTML documents becomes inefficient and can degrade system performance.

In a similar manner, electronic mail data often conforms to particular standard protocols, such as the simple mail transfer protocol ("SMTP"), that require data in a particular order. More specifically, electronic data conforming to SMTP include a header portion that specifies various fields for the electronic mail message. Often, similar to the structured HTML files, the data required for each field is obtained by accessing a database, or data server. Under the conventional document generation approach, the header portion is generated in a linear manner. However, because certain fields with the header portion of an electronic mail message may also depend on the content values of later occurring fields, computing devices generating SMTP mail messages often redundantly access data multiple times to generate the structured electronic document. Again, this approach inefficiently utilizes system communication and processing resources.

Thus, there is a need for a system and method for generating structured documents having a particular order in a non-linear manner.

SUMMARY OF THE INVENTION

A system and method for generating structured electronic documents in a non-linear manner are provided. A document generation server obtains a request to generate an electronic document having logically ordered sections. Proceeding according to the logical order of the electronic document, the document generation server populates at least a portion of any section having data dependent on a subsequently ordered section with a content bookmark. Thereafter, the document generation server replaces the content bookmark with the dependent data after the data for the subsequently ordered section has been obtained.

In accordance with an aspect of the present invention, a method for generating an electronic document having two or more sections, wherein the two or more sections are arranged in a logical order is provided. A document generation server obtains a request to generate the electronic document. The document generation server obtains a template defining the logical order of the two or more sections of the electronic document. In accordance with the logical order, the order of a first section precedes the order of a second section. The document generation server then determines whether content corresponding to the first section of the electronic document is dependent on the second section.

If the content corresponding to the first section of the electronic document is dependent on the second section, the document generation server populates at least a portion of the first section with a content bookmark. The document generation server then refers to the content bookmark after populating the content of the second section and populates the first section with data dependent on the second section. Thereafter, the document generation server transmits the electronic document.

In accordance with another aspect of the present invention, a computer system for generating an electronic document having two or more sections, wherein the two or more section are arranged in a logical order is provided. The computer system includes a client computer corresponding to a request to generate the electronic document. The computer system further includes a document generation server operable to receive the request to generate the electronic document and operable to generate the electronic document corresponding to an identifiable template. The generation of the electronic document by the document generation server includes populating a first logical section dependent on a subsequently occurring logical section with a content bookmark until the subsequently occurring logical section is populated and subsequently replacing the content bookmark with data upon population of the subsequently occurring logical section.

In accordance with a further aspect of the present invention, a method for generating electronic documents having two or more sections, wherein the two or more sections are arranged in a logical order is provided. A document generation server obtains a request to generate the electronic document and determines an electronic document order according to a template such that a first section of the electronic document has an order that precedes an order of a second section of the electronic document. The document generation server then determines whether content corresponding to the first section of the electronic document is dependent on the second section. The document generation server populates at least a portion of the first section with a content bookmark if the content corresponding to the first section of the electronic document is dependent on the second section. The document generation server then populates the first section corresponding to the content bookmark with data dependent on the second section after populating the second section.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

Figure 9:
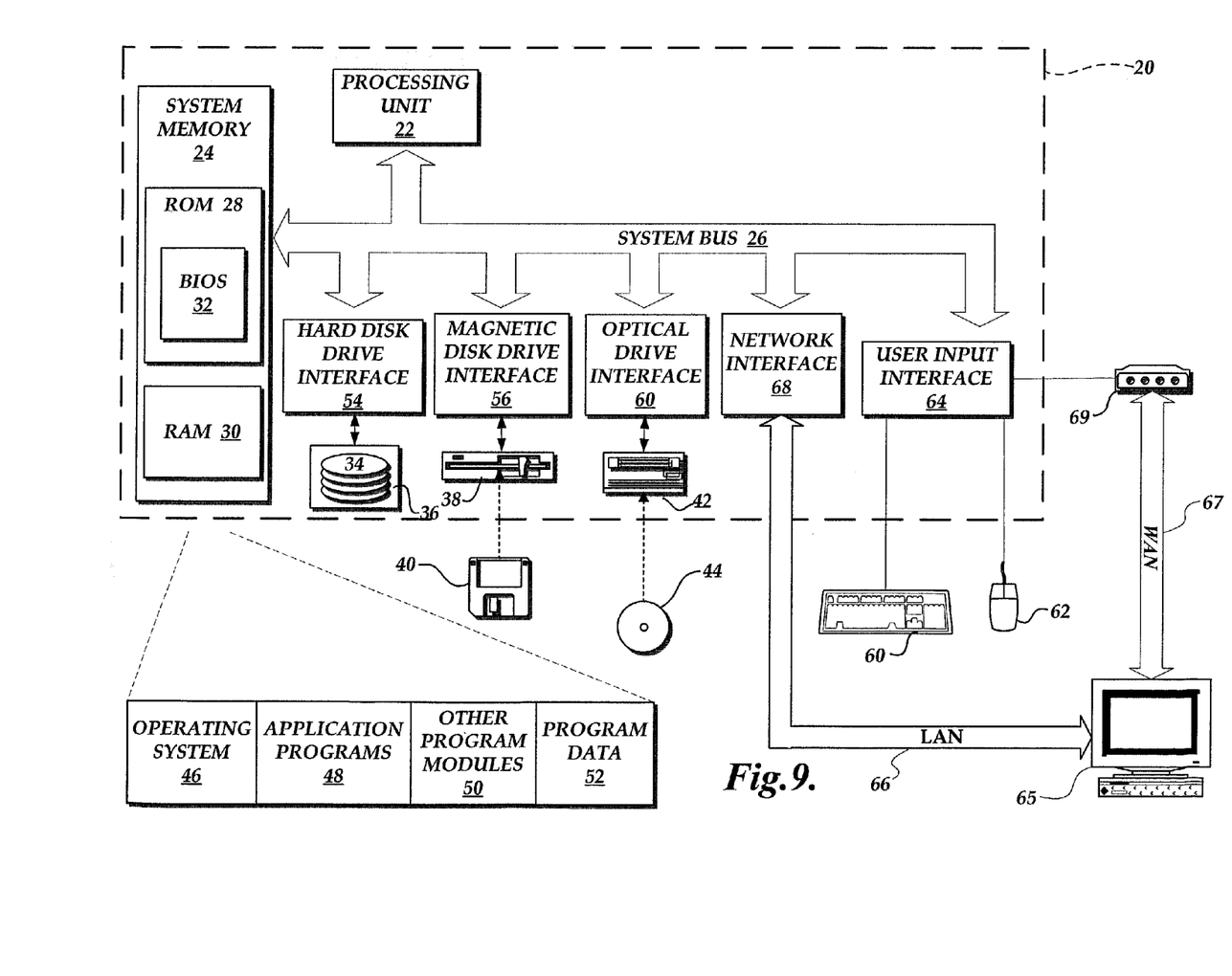
FIG. 9 is a block diagram of a computer environment suitable for the present invention.

FIG. 9 illustrates an example of a suitable computing system environment in which the invention may be implemented. The computing system environment is only one example of a suitable computing environment and is not intended to suggest any limitation as to the scope of use or functionality of the invention. Neither should the computing environment be interpreted as having any dependent requirement relating to any one or combination of components illustrated in the exemplary operating environment.

The invention is operational in numerous other general purpose or special computing system environments or configurations. Examples of well known computing systems, environments, and/or configurations that may be suitable for implementing the invention include, but are not limited to personal computers, server computers, laptop devices, multiprocessor systems, microprocessor-based systems, network PCs, minicomputers, mainframe computers, distributed computing environments that include any of the above systems or the like.

The invention may be described in the general context of computer-executable instructions, such as program modules, being executed by a computer. Generally, program modules include routines, programs, objects, components, data structures, etc. that perform a particular task or implement particular abstract data types. The invention may be also practiced in distributed computing environments where tasks are performed by remote processing devices that are linked through a communications network. In a distributed computing environment, program modules may be located in both local and remote computer storage media including memory storage devices.

With reference to FIG. 9, an exemplary system for implementing the invention includes a general purpose computing device in the form of a computer 20. Components of a computer 20 include, but are not limited to, a processing unit 22, a system memory 24, and a system bus 26 that couples various system components including the system memory to the processor. The system bus may be any of several types of bus structures including a memory bus or memory controller, peripheral bus, and a local bus using any of a variety of bus architectures. By way of example, not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as a Mezzanine bus.

The computer 20 typically includes a variety of computer-readable media. Computer-readable media can be any available media that can be accessed by the computer 20 and includes both volatile and non-volatile media, removable and non-removable media. By way of example, and not limitation, computer-readable media may comprise computer storage media and communication media. Computer storage media includes, but is not limited to, RAM, ROM, EEPROM, flash memory or other memory technology, CD-ROM, Digital Versatile Disk (DVD) or other optical disk storage, magnetic cassettes, magnetic tape, magnetic disk storage or other magnetic storage devices, or any other medium which can be used to store the desired information and which can be accessed by the computer 20.

The communication media typically embodies computer-readable instructions, data structures, program modules or other data in a modulated data signal such as a carrier wave other transport mechanism and includes any information delivery media. The term "modulated data signal" means a signal that has one or more of its characteristics set or changed in such a manner to encode information in the signal. By way of example, and not limitation, communication media includes wired media such as a wired network or direct wired connection, and wireless media such as acoustic, RF, infrared and other wireless media. Combinations of any of the above should also be included within the scope of computer-readable media.

The system memory 24 includes computer storage media in the form of volatile and/or non-volatile memory such as read only memory (ROM) 28 and random access memory (RAM) 30. A basic input/output system 32 (BIOS), containing the basic routines that help to transfer information between elements within the computer 20, such as during start-up, is typically stored in ROM 28. RAM 30 typically contains data and/or program modules that are immediately accessible to and/or presently being operated on by the processing unit 22. By way of example, and not limitation, FIG. 9 illustrates an operating system 46, application programs 48, other program modules 50, and program data 52.

The computer 20 may also include removable/non-removable, volatile/non-volatile computer storage media. By way of example only, FIG. 9 illustrates a hard disk drive 36 that reads from or writes to non-removable, non-volatile magnetic media 38, a magnetic drive 38 that reads from or writes to a removable, non-volatile magnetic disk 40, and an optical disk drive 42 that reads from or writes to a removal, non-volatile optical disk 44, such as CD-ROM or other optical media. Other removable/non-removable, volatile/non-volatile computer storage media that can be used in the exemplary operating environment include, but are not limited to, magnetic tape cassettes, flash memory cards, DVD, digital video tape, Bernoulli cap cartridges, solid state RAM, solid state ROM, and the like. The hard disk drive 34, magnetic disk drive 38, and optical disk drive 42 may be connected to the system bus 26 by a hard disk drive interface 54, a magnetic disk drive interface 56, and an optical drive interface 58, respectively. Alternatively, the hard disk drive 34, magnetic disk drive 38, and optical disk drive 42 are typically connected to the system bus 26 by a Small Computer System Interface (SCSI).

The drives and their associated computer storage media discussed above and illustrated in FIG. 9, provide storage of computer-readable instructions, data structures, program modules and other data for the computer 20. In FIG. 9, for example, the hard disk drive 34 is illustrated as storing the operating system 46, application programs 48, other programs 50, and program data 52. Note that these components can either be the same as or different from the operating system 46, the other program modules 50, and the program data 52. A user may enter commands and information into the computer 20 through an input device such as a keyboard 60 and/or a pointing device 62, commonly referred to as a mouse, track ball or touch pad. Other input devices (not shown) may include a microphone, a joystick, a game pad, a satellite dish, a scanner, or the like. These and other input devices are often connected to the processing unit 22 through user input interface 64 and may be connected by other interface and bus structures, such as a parallel port, game port or other universal serial bus (USB).

The computer 20 may operate in a network environment using logical connections to one or more remote computers 65. The remote computer 65 may be a personal computer, a server, a router, a network PC, a peer device or other common network node, and typically includes many or all of the elements described above relative to the computer 20, although only a memory storage device has been illustrated in FIG. 9. The logical connections depicted in FIG. 9 include a local area network (LAN) 66 and a wide area network (WAN) 67, but also include other networks. Such network environments are commonplace in office, enterprise-wide computer networks, Intranets, and the Internet.

When used in a LAN network environment, the computer 20 is connected to the LAN 66 through a network interface adapter 68. When used in a WAN network environment, the computer typically includes a modem 69 or other means for establishing communications over the WAN 67, such as the Internet. The modem 69, which may be internal or external, may be connected to the system bus 26 via the serial port interface or other appropriate mechanism. In a networked environment, program modules depicted relative to the computer 20, or portions thereof, may be stored in the remote memory storage device. By way of example, and not limitation, FIG. 9 illustrates remote application programs 48 as residing on memory device 24. It will be appreciated that the network connections shown are exemplary in other means of establishing communication between the computers may be used. Although many other internal components of the computer 20 are not shown, those of ordinary skill will appreciate that such components and their interconnection are well known. Accordingly, additional details concerning the internal construction of the computer 20 need not be disclosed in connection with the present invention.

Those skilled in the art will understand that program modules such as the operating system 46, the application programs 48 and data 52 are provided to the computer 20 via one of its memory storage devices, which may include ROM 28, RAM 30, hard disk drive 34, magnetic disk drive 38, or optical disk device 42. The hard disk drive 34 is used to store data 52 and the programs, including the operating system 46 and application programs 48.

When the computer 20 is turned on or reset, the BIOS 32, which is stored in ROM instructs the processing unit 22 to loan the operating system from the hard disk drive 34 into the RAM 30. Once the operating system 46 is loaded into RAM 30, the processing unit executes the operating system code and causes the visual elements associated with the user interface of the operating system to be displayed on the monitor. When an application program 48 is opened by a user, the program code and relevant data are read from the hard disk drive and stored in RAM 38.

As described above, aspects of the present invention are embodied in a World Wide Web ("WWW") or ("Web") site accessible via the Internet. As is well known to those skilled in the art, the term "Internet" refers to the collection of networks and routers that use the Transmission Control Protocol/Internet Protocol ("TCP/IP") to communicate with one another. In accordance with an illustrative embodiment of the Internet, a plurality of local area networks ("LANs") and a wide area network ("WAN") can be interconnected by routers. The routers are special purpose computers used to interface one LAN or WAN to another. Communication links within the LANs may be wireless, twisted wire pair, coaxial cable, or optical fiber, while communication links between networks may utilize 56 Kbps analog telephone lines, 1 Mbps digital T-1 lines, 45 Mbps T-3 lines or other communications links known to those skilled in the art. Furthermore, computers and other related electronic devices can be remotely connected to either the LANs or the WAN via a digital communications device, modem and temporary telephone, or a wireless link. The Internet has recently seen explosive growth by virtue of its ability to link computers located throughout the world. As the Internet has grown, so has the WWW.

As is appreciated by those skilled in the art, the WWW is a vast collection of interconnected or "hypertext" documents written in HyperText Markup Language ("HTML"), or other markup languages, that are electronically stored at or dynamically generated by "WWW sites" or "Web sites" throughout the Internet. Additionally, client-side software programs that communicate over the Web using the TCP/IP protocol are part of the WWW, such as JAVA® applets, instant messaging, e-mail, browser plug-ins, Macromedia Flash, chat and others. Other interactive hypertext environments may include proprietary environments such as those provided by an number of online service providers, as well as the "wireless Web" provided by various wireless networking providers, especially those in the cellular phone industry. It will be appreciated that the present invention could apply in any such interactive communication environments, however, for purposes of discussion, the Web is used as an exemplary interactive hypertext environment with regard to the present invention.

A Web site is a server/computer connected to the Internet that has massive storage capabilities for storing hypertext documents and that runs administrative software for handling requests for those stored hypertext documents as well as dynamically generating hypertext documents. Embedded within a hypertext document are a number of hyperlinks, i.e., highlighted portions of text which link the document to another hypertext document possibly stored at a Web site elsewhere on the Internet. Each hyperlink is assigned a Uniform Resource Locator ("URL") that provides the name of the linked document on a server connected to the Internet. Thus, whenever a hypertext document is retrieved from any web server, the document is considered retrieved from the World Wide Web. Known to those skilled in the art, a web server may also include facilities for storing and transmitting application programs, such as application programs written in the JAVA® programming language from Sun Microsystems, for execution on a remote computer. Likewise, a web server may also include facilities for executing scripts and other application programs on the web server itself.

A remote access user may retrieve hypertext documents from the World Wide Web via a web browser program. A web browser, such as Netscape's NAVIGATOR® or Microsoft's Internet Explorer, is a software application program for providing a user interface to the WWW. Using the web browser via a remote request, the web browser requests the desired hypertext document from the appropriate web server using the URL for the document and the HyperText Transport Protocol ("HTTP"). HTTP is a higher-level protocol than TCP/IP and is designed specifically for the requirements of the WWW. HTTP runs on top of TCP/IP to transfer hypertext documents and user-supplied form data between server and client computers. The WWW browser may also retrieve programs from the web server, such as JAVA applets, for execution on the client computer. Finally, the WWW browser may include optional software components, called plug-ins, that run specialized functionality within the browser.

The present invention relates to a system and method for generating ordered documents in a non-linear manner. In accordance with an actual embodiment of the present invention, a system and method for generating ordered markup language documents in response to a user request are provided. In accordance with another embodiment of the present invention, a system and method for generating ordered SMTP electronic mail documents are also provided. As will be readily understood by one skilled in the relevant art, the present invention is not limited to its application to structured markup language documents, such as HTML or XML documents and SMTP electronic mail documents. Instead, the disclosed embodiments are only done by way of example and should not be construed as limiting.

Figure 2:
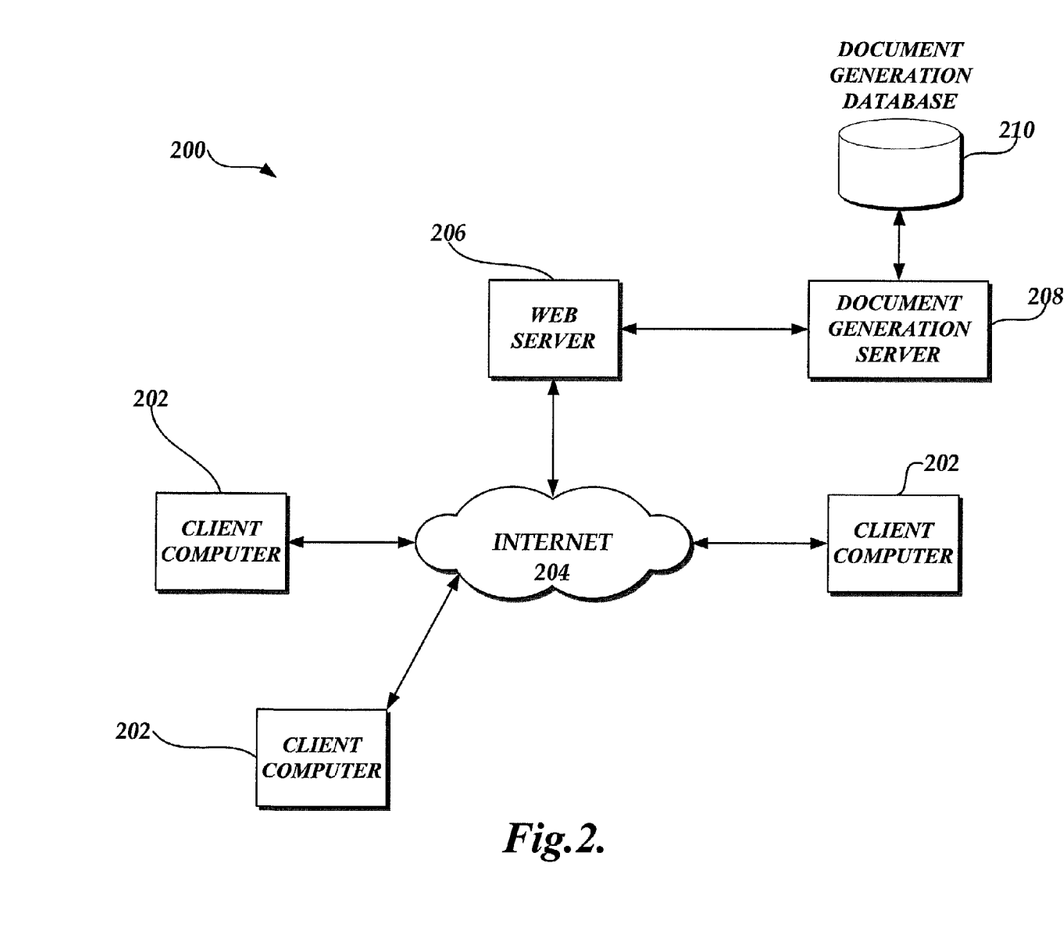
FIG. 2 is a block diagram illustrative of a structured document generation system in accordance with the present invention.

FIG. 2 is a block diagram of a structured document generation system 200 in accordance with the present invention. As illustrated in FIG. 2, the structured document generation system 200 includes one or more client computers 202 operable to request and receive structured documents, such as HTML or XML documents, via a global communication network, such as the Internet 204. The structured document generation system 200 also includes one or more Web server computing devices 206 operable to receive the requests for the structured document from the client computers 202, to obtain the corresponding document and to transmit the corresponding document to the client computer 202. One skilled in the relevant art will appreciate that the structured document generation system 200 of the present invention may be utilized in other communication networks, such as Intranets and the like.

In accordance with a distributed computing embodiment of the present invention, the Web server 206 is in communication with one or more document generation servers 208 operable to obtain a request to generate the requested structured document from the Web server. The document generation server 206 is further in communication with one or more databases 210 for obtaining some or all of the requested content. Accordingly, the document generation server 206 can dynamically generate the requested structured document and transmit the document to the Web server 206 for delivery to the requesting client computer 202 via the Internet 204. One skilled in the relevant art will appreciate that any number of distributed computing embodiments, or alternative computing configurations, may be utilized in accordance with the present invention. Further, one skilled in the relevant art will appreciate that the structured document generation system 200 illustrates a "pull" model in which structured documents are generated by the document generations server 208 upon receiving client computer issued requests.

Figure 3:
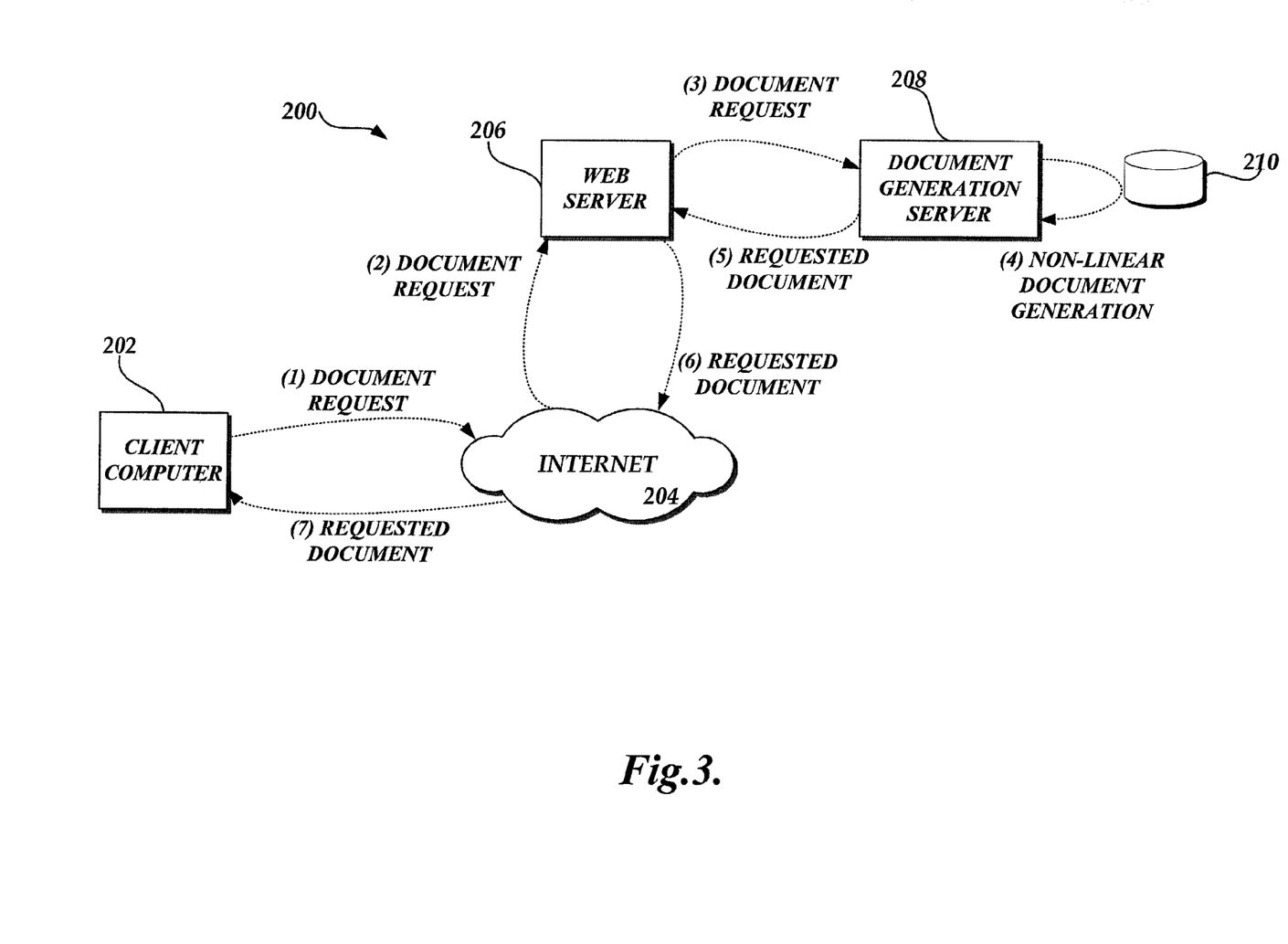
FIG. 3 is a block diagram of the structured document generation system of FIG. 2 illustrating the request and generation of a structured HTML file in accordance with the present invention.

With reference to FIG. 3, an illustrative process for generating a structured graphical user interface markup language document within the structured document generation system 200 will be described. The process is initiated by the generation of a document request by the client computer 202 to the Web server 206 via the Internet 204. In an illustrative embodiment of the present invention, the structured document request can include user identification information, such as a user identifier, passwords, and the like. For example, the structured document request can a request to obtain a Web page that includes at least one section displaying textual messages posted for a particular user. Additionally, the Web page can include additional sections that relate in some manner to the message section (e.g., displaying the number of message received).

Upon obtaining the structured document request, the Web server 206 transmits the request to the document generation server 208. In accordance with the present invention, and as will be explained in greater detail below, the document generation server 208 generates the requested structured document in a non-linear manner, thereby mitigating the amount of processing required to generate the request document. The requested document is transmitted to the Web server 206 and returned to the requesting client computer 202 via the Internet 204.

Figure 4:
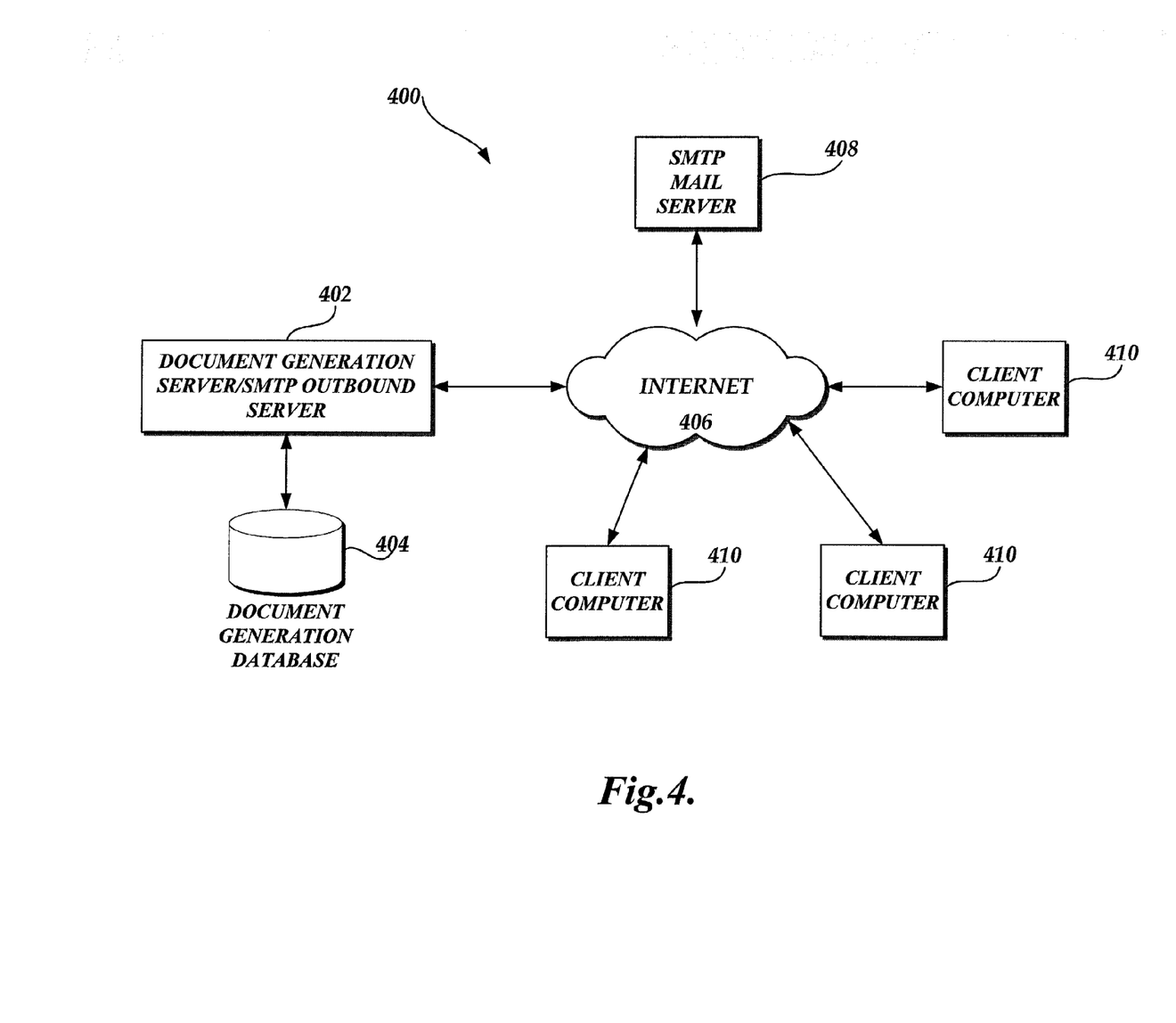
FIG. 4 is a block diagram illustrative of a structured electronic mail generation system in accordance with the present invention.

In accordance with another embodiment of the present invention, a structured document generation routine may also be utilized in accordance with SMTP electronic mail embodiment. FIG. 4 is a block diagram of another structured document generation system 400 in accordance with the present invention. As illustrated in FIG. 4, the structured document generation system 400 includes a document generation server 402, such as a SMTP mail server, capable of generating and transmitting structured SMTP encoded electronic mail messages directed to an identifiable user on a communication network, such as the Internet 406. The document generation server 402 can communicate with one or more document databases 404 to obtain the data necessary to complete the fields of the SMTP header files for the electronic mail message. The structured document generation system 400 also includes a SMTP mail server 408 capable of obtaining the SMTP encoded messages and transmitting the messages to an identifiable computing device. Additionally, the structured document generation system 400 includes one or more client computing devices 410 operable to request electronic messages from the SMTP inbound server 408. One skilled in the relevant art will appreciate that the structured document generation system 400 illustrates a "push" model in which structured documents are generated by the document generation server 402 without receiving client computer requests.

Figure 5A:
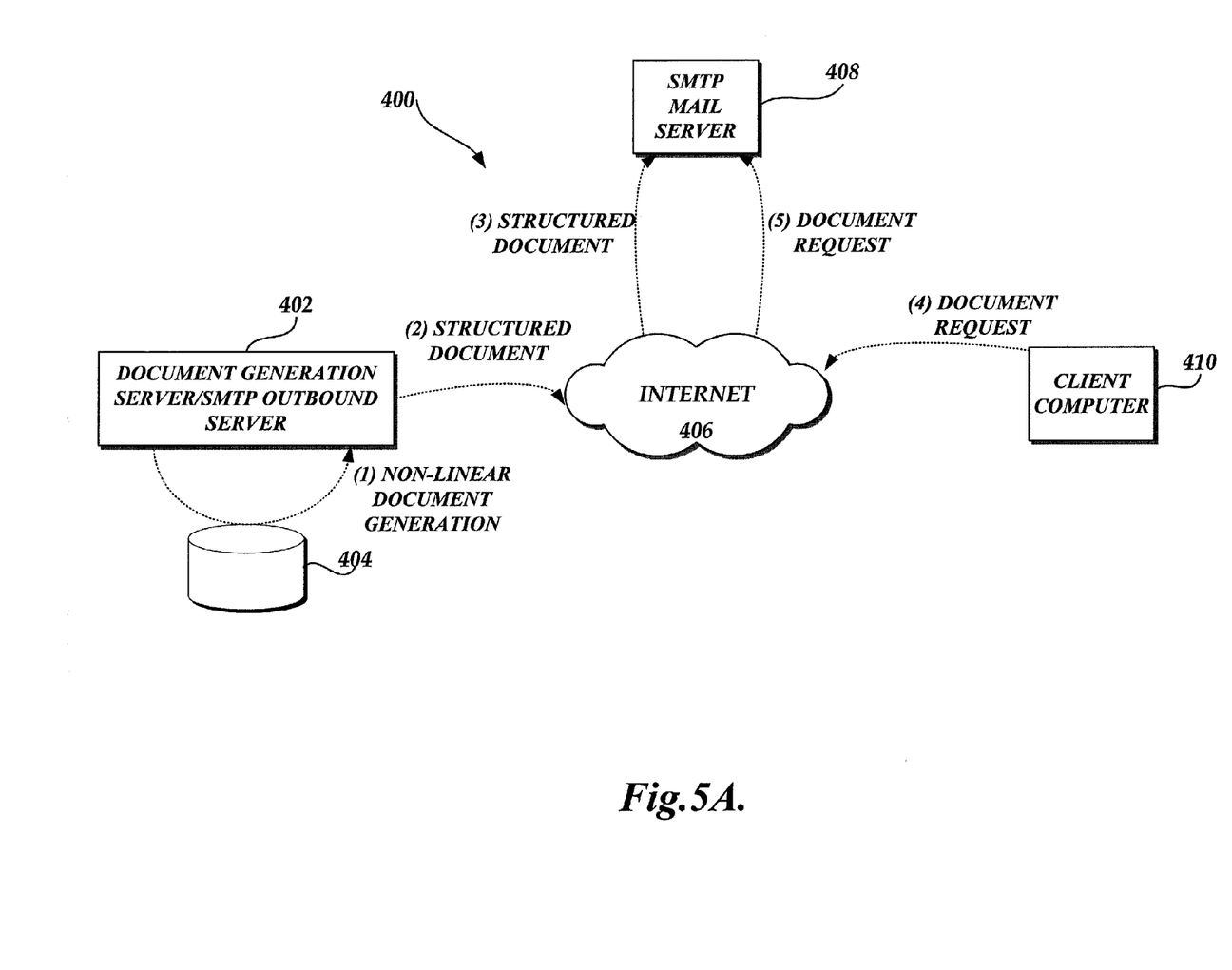
FIGS. 5A and 5B are block diagrams of the structured electronic mail generation system of FIG. 4 illustrating the generation of a structured electronic mail file in accordance with the present invention.
Figure 5B:
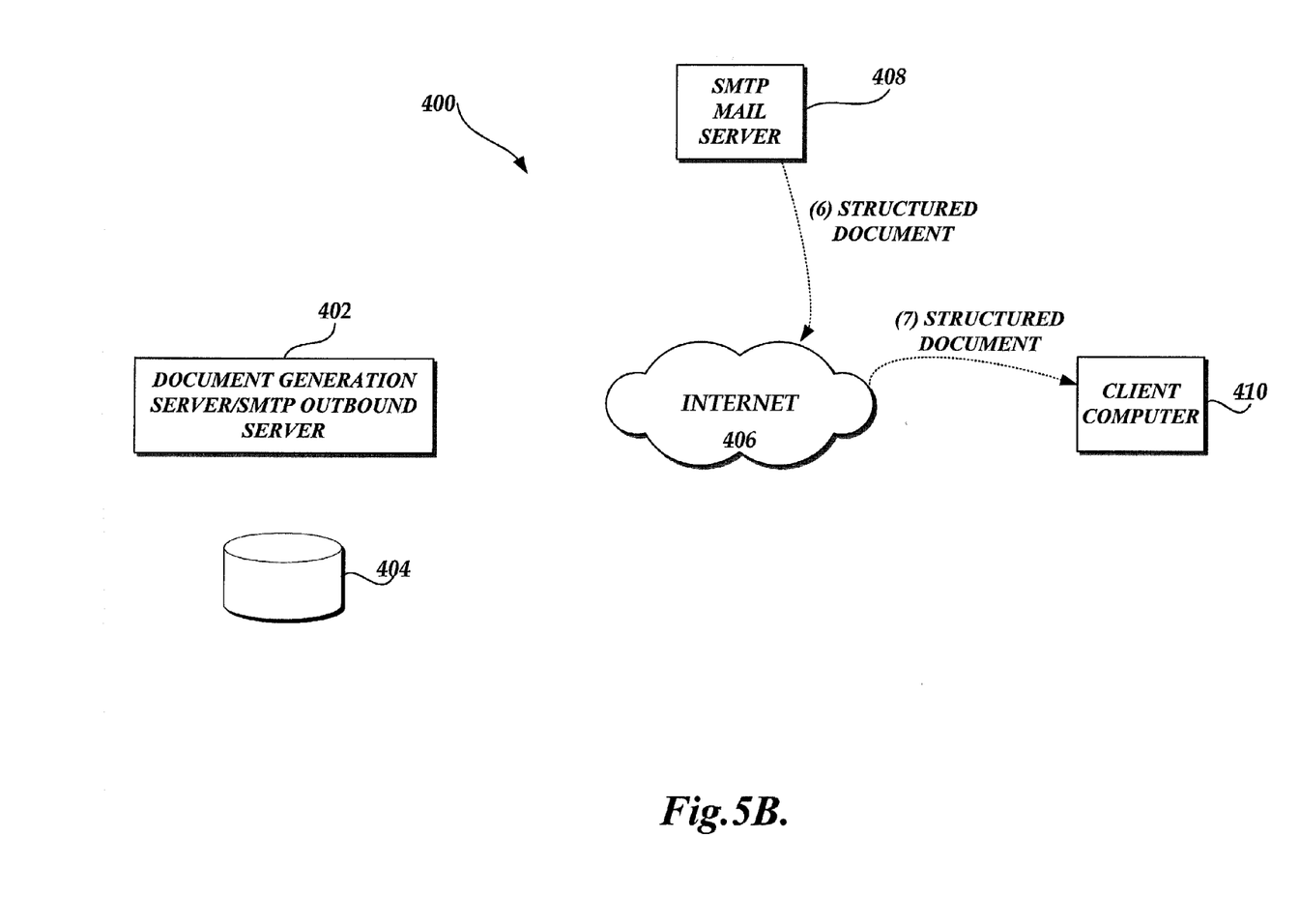

With reference to FIG. 5, an illustrative process for generating a structured SMTP encoded mail document within the structured document generation system 400 will be described. Unlike the structured document generation system 200 (FIGS. 2 and 3), the structured document generation process is initiated by the document generation server 402. In an illustrative embodiment of the present invention, the document generation server 402 generates the structured SMTP electronic mail, including the header file, in a non-linear manner in accordance with the present invention. One skilled in the relevant art will appreciate that the document generation server may be utilized to generate the structured SMTP electronic mail file and transmitted to a separate SMTP outbound server (not shown). The structured SMTP electronic mail is transmitted, via the Internet 406, to the SMTP mail server 408. Thereafter, a client computing device 410 corresponding to the electronic mail message communicates with the SMTP mail server 408 and obtains the structured electronic mail file. Although the FIG. 5 illustrates the client computer 410 communicating via the Internet 406, one skilled in the relevant art will appreciate that the client computer 410 and the SMTP mail server 408 may communicate via a direct communication line or via a LAN.

Figure 6:
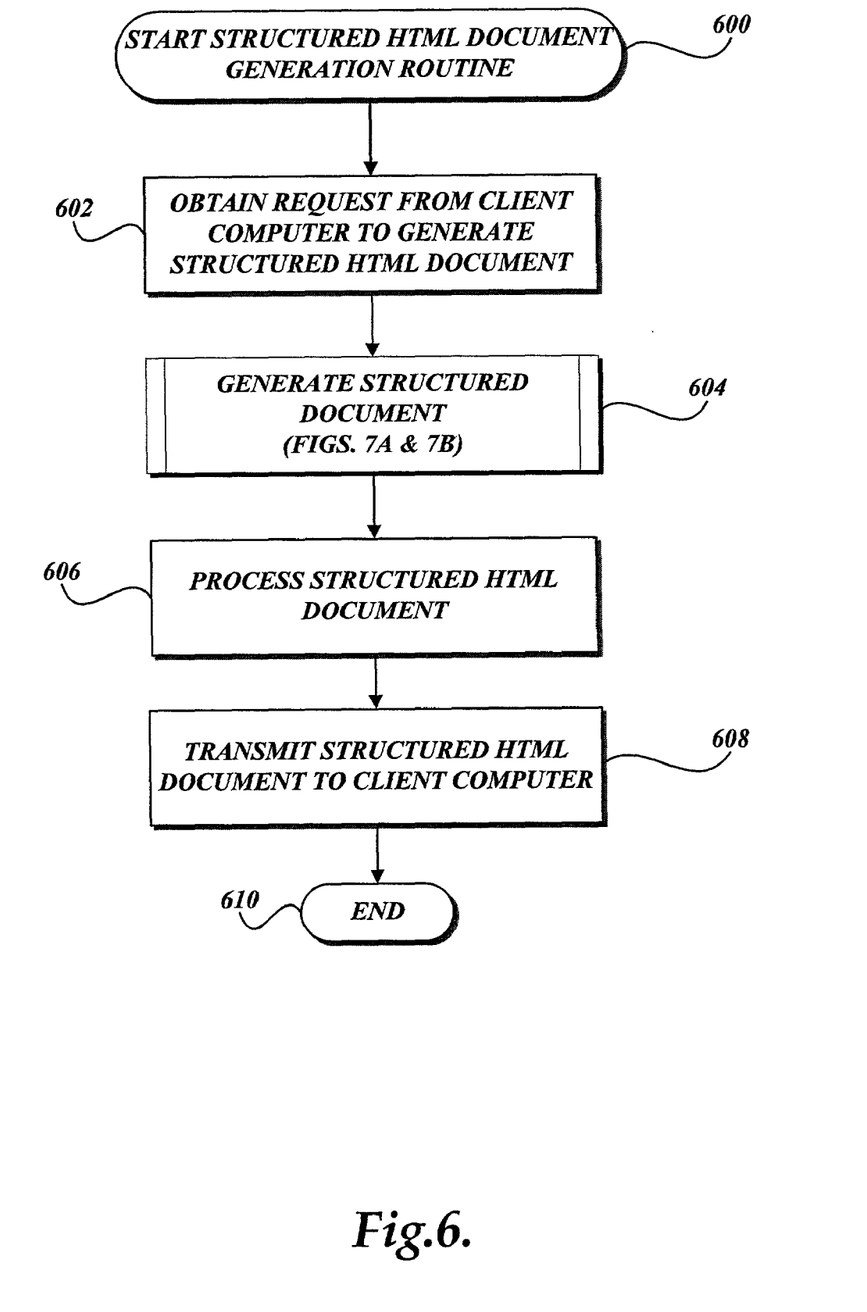
FIG. 6 is a flow diagram illustrative of a structured HTML document generation routine implemented by a document generation server in accordance with the present invention.
Figure 7A:
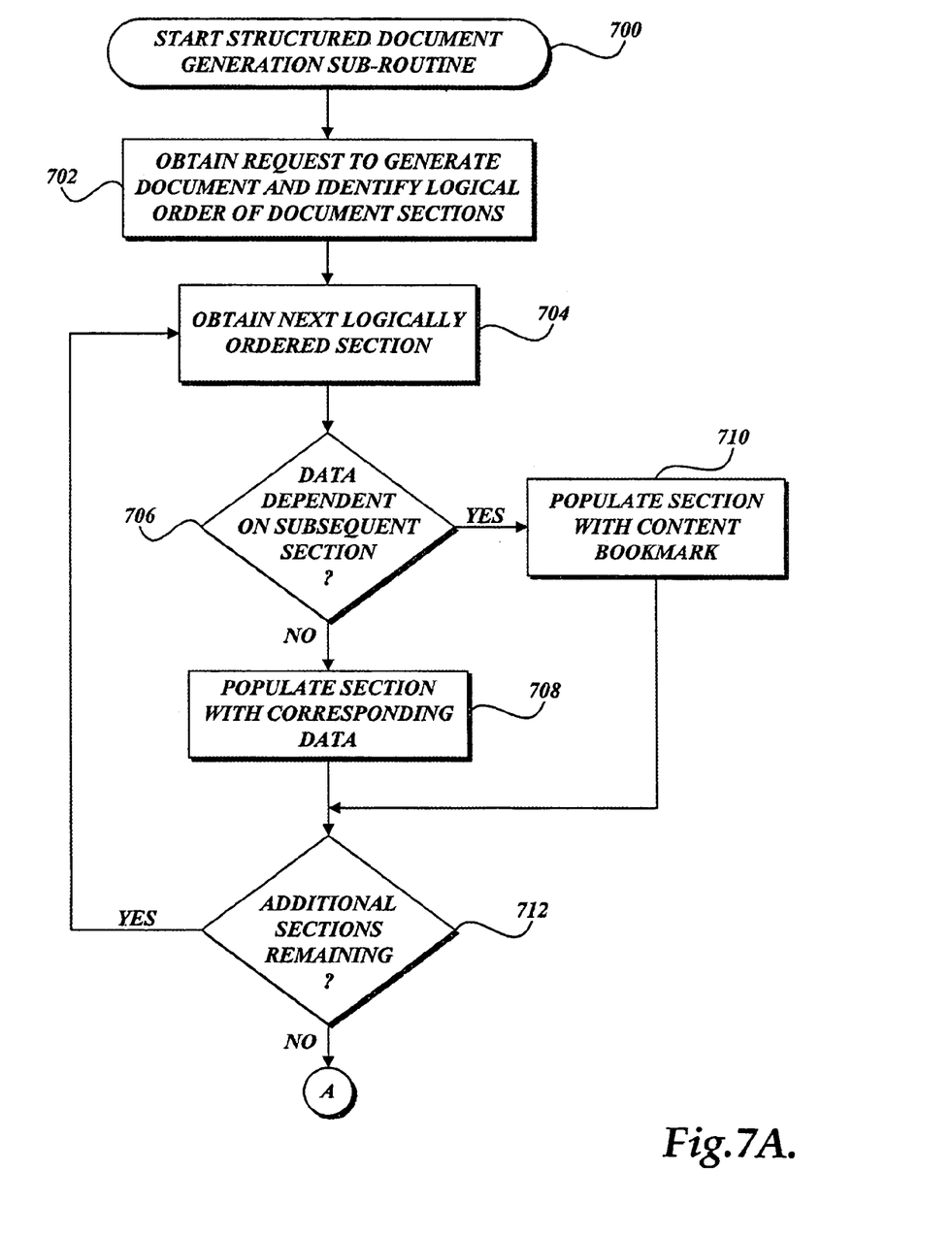
FIGS. 7A and 7B are flow diagrams illustrative of a structured document generation sub-routine implemented by a document generation server in accordance with the present invention.
Figure 7B:
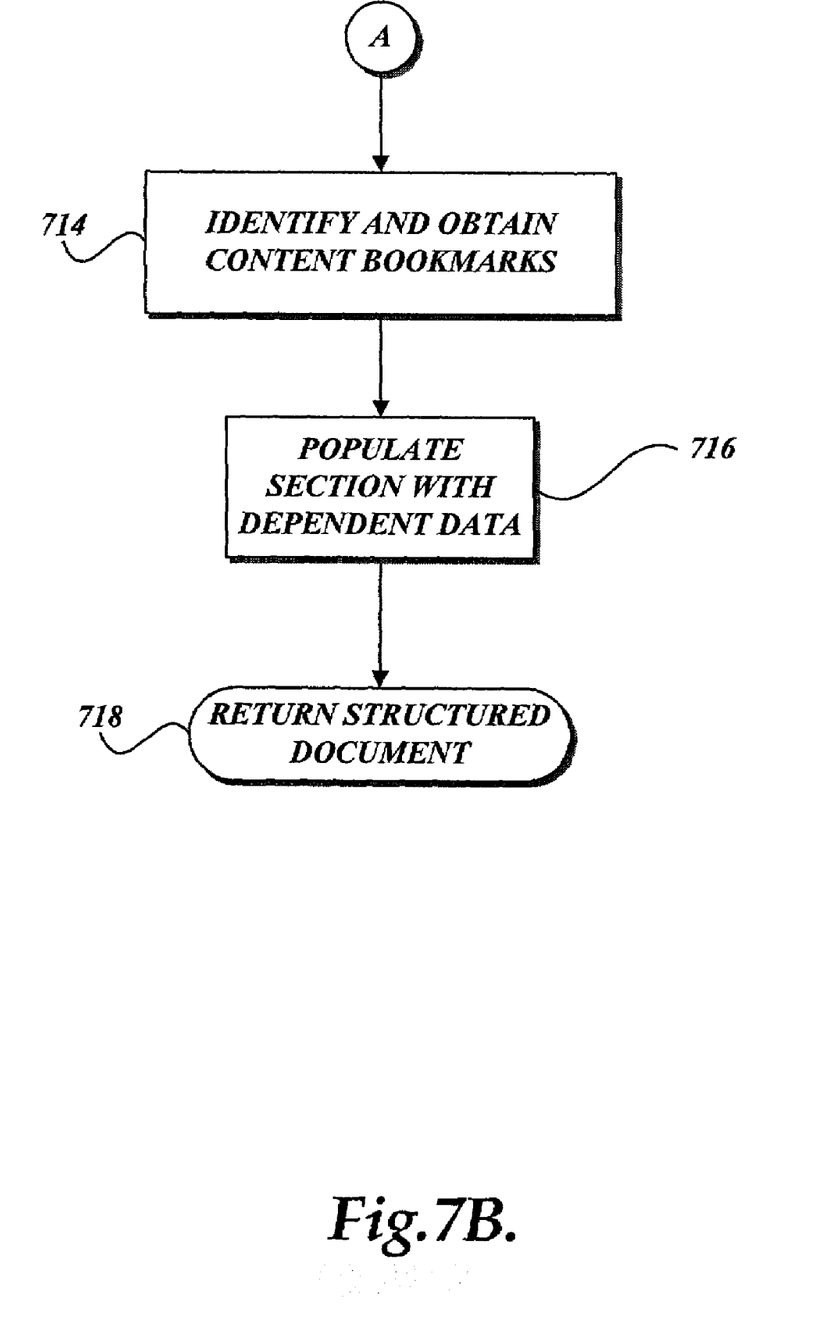
Figure 8:
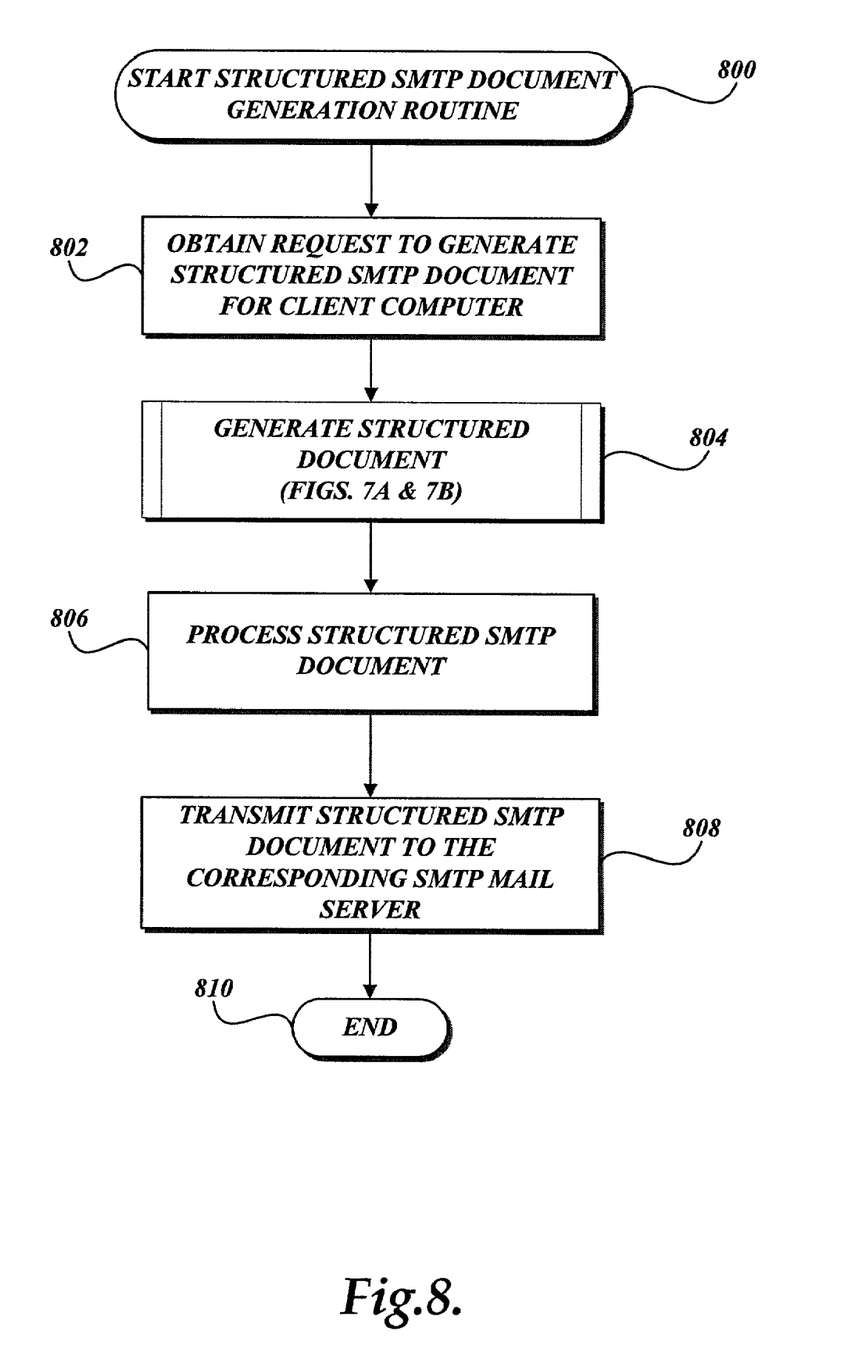
FIG. 8 is a flow diagram illustrative of a structured SMTP document generation routine implemented by a document generation server in accordance with the present invention.

With reference now to FIGS. 6–8, illustrative routines for generating structured documents in a non-linear manner will be described. With reference to FIG. 6, an illustrative routine 600 implemented by the document generation server 208 for generating structured HTML markup language documents will be described. One skilled in the relevant art will appreciate that routine 600 illustrates a routine for a "pull" communication model. At block 602, the document generation server 208 obtains a request from a client computer 202 to generate a structured HTML document. As described above, in an illustrative embodiment of the present invention, the request from the client computer 202 may be transmitted to the document generation server 208 via a Web server 206. Additionally, the document generation request can include a number of identifiers that may be utilized by the document generation server 208 to obtain user-specific data from the document generation database 210.

At block 604, the document generation server 208 dynamically generates one or more structured HTML documents corresponding to the client computer 202 request. One skilled in the relevant art will appreciate that although HTML documents are utilized in the illustrative embodiment, the document generation server 208 may generate structured documents utilizing other markup languages, such as XML. FIGS. 7A and 7B are illustrative of a structured document generation sub-routine 700 implemented by the document generation server 208 in accordance with the present invention. With reference first to FIG. 7A, at block 702, the document generation server 208 obtains the request to generate the structured document and identifies the logical order of the document sections. In this illustrative example, the request from the client computer 202 is for a structured HTML document. Accordingly, the document generation server 208 would obtain a template of the sections of the structured document corresponding to the document request. For example, if the client computer request is processed through a Web server 206 corresponding to a chat room, the document generation server 208 would obtain a corresponding template corresponding to the chat room design. One skilled in the relevant art will appreciate that some of the design templates may be pre-generated. Alternatively, at least some of the design templates may be dynamically generated at the time the user request is obtained.

At block 704, the document generation server 208 obtains the next logically ordered section of the structured document template. At decision block 706, a test is conducted to determine whether data in the section is dependent on one or more subsequently occurring section in the structured document template. In an illustrative embodiment of the present invention, data in a section may be dependent on an analysis of data that will be appearing in a latter processed section. For example, if a section includes a parameter that identifies the number of textual messages that have been sent to an identifiable user and the textual messages will appear in a latter processed section, the first section would be determined to be dependent on the latter occurring section. If the data is not dependent on a latter occurring section, at block 708, the document generation server 208 populates the section with corresponding data. In an illustrative embodiment of the present invention, the population of data can include the insertion of static HTML code previously generated by the document generation server 208. Additionally, the population can include the dynamic processing of data obtained from the document generation database 210.

Returning to decision block 706, if the data is dependent on a latter occurring section, at block 710, the document generation server 208 populates the section with a content bookmark. In an illustrative embodiment of the present invention, the document generation server 208 inserts a content bookmark into the structured document to allow the document generation server 208 to insert HTML code at a later point, while preserving the place of the code within the structured document. Additionally, the utilization of the content bookmark mitigates the need for the document generation server 208 to redundantly access the underlying data. In an illustrative embodiment of the present invention, the content bookmark may correspond to all of the content associated with the particular section of the electronic document. Alternatively, the content bookmark may correspond to only a portion of the content associated with the particular section of the electronic document. Moreover, content dependent on multiple sections may be embodied in a single content bookmark or a series of bookmarks. Upon population of the data in either block 708 or block 710, at decision block 712, a test is conducted to determine whether additional sections remain in the structured document. If additional sections remain, the sub-routine 700 returns to block 704.

With reference to FIG. 7B, if no additional sections remain in the structured document, at block 714, the document generation server 208 identifies and obtains the content bookmarks generated at block 710. At block 716, the document generation server 208 populates the section with the dependent content data. With reference to the previous example regarding the message identifier, the document generation server 208 is able to populate the section of the structured document with the message identifier without a redundant access to the database because the message data was obtained in the latter section. In accordance with the present invention, each section of the electronic document can include more than one content bookmark. Additionally, in illustrative embodiment, a single content bookmark may correspond to data dependent on multiple sections of the electronic document. At block 718, the sub-routine 700 terminates and returns the generated structured document.

Returning to FIG. 6, at block 606, the document generation server 208 processes the structured HTML document. In an illustrative embodiment of the present invention, the client computer request may not require the generation of the entire HTML document. However, if the number of templates maintained by the document generation server 208 is limited, the entire structured document may be generated accordingly to a template and any sections not responsive to the request may be omitted subsequently by the document generation server 208. However, one skilled in the relevant art will appreciate that block 606 may be omitted. At block 608, the document generation server 208 transmits the structured HTML document to the requesting client computer 202. At block 610, the routine 600 ends.

With reference now to FIG. 8, an illustrative routine 800 for generating structured HTML electronic mail documents will be described. One skilled in the relevant art will appreciate that routine 800 illustrates a routine for a "push" communication model. At block 802, the document generation server 402 obtains a request from a computing device to generate a structured electronic mail message directed to a client computer 410. As described above, the document generation request can include a number of identifiers that may be utilized by the document generation server 402 to obtain user-specific data from the document generation database 404.

At block 804, the document generation server 402 dynamically generates one or more structured SMTP documents corresponding to the request to generate electronic mail to the client computer 410. In an illustrative embodiment of the present invention, the document generation server 402 can implement sub-routine 700 (FIGS. 7A & 7B) to generate the structured electronic document. More specifically, in an illustrative embodiment of the present invention, sub-routine 700 may be utilized to generate the appropriate structured SMTP header files for electronic message while mitigating redundant accessing of the document generation database 404 to populate the fields of the SMTP header. Alternatively, sub-routine 700 may be modified to conform to the specific requirements/characteristics of the structured document.

At block 806, the document generation server 402 processes the structured SMTP document. In an illustrative embodiment of the present invention, the client computer request may not require the generation of the entire SMTP document. However, if the number of templates maintained by the document generation server 402 is limited, the entire structured document may be generated accordingly to a template and any sections not responsive to the request may be omitted subsequently by the document generation server 402. However, one skilled in the relevant art will appreciate that block 806 may be omitted. At block 808, the document generation server 402 transmits the structured SMTP document to the requesting client computer 410, such as through the SMTP inbound server 408. At block 810, the routine 800 ends.

While illustrative embodiments of the invention have been illustrated and described, it will be appreciated that various changes can be made therein without departing from the spirit and scope of the invention. More specifically, one skilled in the relevant art will appreciate that the document generation routines may be implemented with any number of structured documents, such as documents conforming to the Simple Object Access Protocol ("SOAP") and the like. All are considered to be within the scope of the present invention.

The embodiments of the invention in which an exclusive property or privilege is claimed are defined as follows:

1. A method for generating an electronic document having two or more sections, wherein the two or more sections are arranged in a logical order, the method comprising:

obtaining a request to generate the electronic document from a client computer;

obtaining a template defining a logical order of two or more sections of electronic document, wherein a logical order of a first section precedes a logical order of a second section;

determining whether content corresponding to the first section of the electronic document is dependent on the second section;

populating at least a portion of the first section with a content bookmark if the content corresponding to the first section of the electronic document is dependent on the second section;

populating, without accessing a database, the portion of the first section corresponding to the content bookmark with data dependent on the second section before transmitting the electronic document to the client computer;

populating at least a portion of the first section with a second content bookmark if the content corresponding to the first section is dependent on a third section of the electronic document;

populating, without accessing a database, the portion of the first section corresponding to the second content bookmark with data dependent on the third section; and transmitting the electronic document to the client computer.

2. The method as recited in claim 1 further comprising processing the electronic document prior to transmitting the electronic document.

3. The method as recited in claim 2, wherein processing the electronic document includes deleting any sections of the electronic document not requested.

4. The method as recited in claim 1, wherein obtaining a request to generate an electronic document includes obtaining the request from a client computer.

5. The method as recited in claim 1, wherein obtaining a request to generate an electronic document includes a request from a client computer to generate a structured document corresponding to a graphical user interface.

6. The method as recited in claim 5, wherein the electronic document is a structured HTML document.

7. The method as recited in claim 5, wherein the electronic document is a structured XML document.

8. The method as recited in claim 1, wherein obtaining a request to generate an electronic document includes a request to generate a structured electronic mail document to a client computer.

9. The method as recited in claim 8, wherein the structured electronic mail document is a simple mail transfer protocol encoded electronic document.

10. The method as recited in claim 1, wherein the request to generate the electronic document includes data identifying a particular user and wherein populating the first logically ordered section with data dependent on the second logically ordered section includes populating the first logically ordered section with data unique to the particular user.

11. The method as recited in claim 1, wherein populating the first logically ordered section with data dependent on the second logically ordered section occurs immediately upon population of the second logically ordered section.

12. The method as recited in claim 1, wherein populating the first logically ordered section with data dependent on the second logically ordered section occurs upon population of all non-dependent logically ordered sections.

13. The method as recited in claim 12 further comprising traversing the electronic document to identify all content bookmarks upon completion of all non-dependent logically ordered sections.

14. The method as recited in claim 1, wherein the template is dynamically generated.

15. A computer-readable medium having computer-executable instructions for performing the method recited in claim 1.

16. A computer system having a processor, a memory and an operating environment, the computer system operable to perform the method recited in claim 1.

17. A computer system for generating an electronic document having two or more sections, wherein the two or more section are arranged in a logical order, the computer system comprising:

a client computer operable to transmit a request to generate the electronic document;

a document generation server operable to receive the request to generate the electronic document and operable to generate the electronic document corresponding to an identifiable template;

wherein the document generation server is further operable to: (i) populate, without assessing a database, at least a portion of a first logical section dependent on a subsequently occurring logical section with a content bookmark until the subsequently occurring logical section is populated; (ii) subsequently replace the content bookmark with data upon population of the subsequently occurring logical section; and (iii) populate, without accessing a database, the at least a portion of the first section corresponding to the second content bookmark with data dependent on the third section.

18. The computer system as recited in claim 17, wherein the document generation server is further operable to process the generated document to remove any sections not included in the document request.

19. The computer system as recited in claim 17, wherein the request for the electronic document includes a request for a request to generate a structured document corresponding to a graphical user interface.

20. The computer system as recited in claim 19, wherein the electronic document is a structured HTML document.

21. The computer system as recited in claim 19, wherein the electronic document is a structured XML document.

22. The computer system as recited in claim 17, wherein the request to generate an electronic document includes a request to generate a structured electronic mail document directed to a client computer.

23. The computer system as recited in claim 22, wherein the structured electronic mail document is a simple mail transfer protocol encoded electronic document.

24. The computer system as recited in claim 17, wherein the document generation server is operable to populate the first logical section immediately upon population of the subsequently occurring logical section.

25. The computer system as recited in claim 17, wherein the document generation server is operable to populate any logical sections having a content bookmark upon population of all non-dependent logically ordered sections.

26. The computer system as recited in claim 17, wherein the document generation server is further operable to populate at least a portion of this first section with a second content bookmark if the content corresponding to the at least a portion of the first section is dependent on a third section of the electronic document.

27. A method for generating electronic documents having two or more sections, wherein the two or more sections are arranged in a logical order, the method comprising:

obtaining a request to generate the electronic document;

determining an electronic document order according to a template, wherein a first section of the electronic document has an order that precedes an order of a second section of the electronic document;

determining whether content corresponding to the first section of the electronic document is dependent on the second section;

populating at least a portion of the first section with a content bookmark if the content corresponding to the first section of the electronic document is dependent on the second section;

populating, without accessing a database, the first section corresponding to the content bookmark with data dependent on the second section after populating the second sections;

populating at least a portion of the first section with a second content bookmark if the content corresponding to the first section is dependent on a third section of the electronic document; and populating, without accessing a database, the portion of the first section corresponding to the second content bookmark with data dependent on the third section.

28. The method as recited in claim 27 further comprising:
processing the electronic document; and
transmitting the electronic document.

29. The method as recited in claim 28, wherein processing the electronic document includes deleting any sections of the electronic document not requested.

30. The method as recited in claim 27, wherein obtaining a request to generate an electronic document includes obtaining the request from a client computer.

31. The method as recited in claim 27, wherein obtaining a request to generate an electronic document includes a request from a client computer to generate a structured document corresponding to a graphical user interface.

32. The method as recited in claim 29, wherein the electronic document is a structured HTML document.

33. The method as recited in claim 29, wherein the electronic document is a structured XML document.

34. The method as recited in claim 27, wherein obtaining a request to generate an electronic document includes a request to generate a structured electronic mail document to a client computer.

35. The method as recited in claim 34, wherein the structured electronic mail document is a simple mail transfer protocol encoded electronic document.

36. The method as recited in claim 27, wherein the request to generate the electronic document includes data identifying a particular user and wherein populating the first logically ordered section with data dependent on the second logically ordered section includes populating the first logically ordered section with data unique to the particular user.

37. The method as recited in claim 27, wherein populating the first logically ordered section with data dependent on the second logically ordered section occurs immediately upon population of the second logically ordered section.

38. The method as recited in claim 27, wherein populating the first logically ordered section with data dependent on the second logically ordered section occurs upon population of all non-dependent logically ordered sections.

39. The method as recited in claim 38 further comprising traversing the electronic document to identify any content bookmarks upon completion of all non-dependent logically ordered sections.

40. The method as recited in claim 27, wherein the template is dynamically generated.

41. A computer-readable medium having computer-executable instructions for performing the method recited in claim 27.

42. A computer system having a processor, a memory and an operating environment, the computer system operable to perform the method recited in claim 27.

* * * * *